US012271013B2

(12) United States Patent
Houck et al.

(10) Patent No.: US 12,271,013 B2
(45) Date of Patent: Apr. 8, 2025

(54) OPTICAL FILTER

(71) Applicant: VIAVI Solutions Inc., San Jose, CA (US)

(72) Inventors: William D. Houck, Santa Rosa, CA (US); Charles Andrew Hulse, Sebastopol, CA (US)

(73) Assignee: VIAVI Solutions Inc., Chandler, AZ (US)

( * ) Notice: Subject to any disclaimer, the term of this patent is extended or adjusted under 35 U.S.C. 154(b) by 84 days.

(21) Appl. No.: 17/661,140

(22) Filed: Apr. 28, 2022

(65) Prior Publication Data
US 2023/0350117 A1    Nov. 2, 2023

(51) Int. Cl.
*G02B 5/28* (2006.01)
*G02B 5/20* (2006.01)

(52) U.S. Cl.
CPC ............ *G02B 5/288* (2013.01); *G02B 5/201* (2013.01)

(58) Field of Classification Search
CPC ..... G02B 5/284–288; G02B 5/201–283; G01J 3/26; G01J 3/2803; H01L 27/14685
See application file for complete search history.

(56) References Cited

U.S. PATENT DOCUMENTS

| 5,272,518 A * | 12/1993 | Vincent | G01J 3/51 250/226 |
| 5,784,507 A * | 7/1998 | Holm-Kennedy | G02B 6/1228 385/36 |
| 2002/0131047 A1 * | 9/2002 | Zarrabian | G01J 3/26 356/454 |
| 2014/0256079 A1 * | 9/2014 | Shibayama | H01L 31/1896 438/65 |
| 2015/0036133 A1 * | 2/2015 | Uematsu | G01B 11/26 250/226 |
| 2017/0341451 A1 * | 11/2017 | Minamidate | B32B 17/10458 |
| 2020/0310105 A1 * | 10/2020 | Kawai | G01J 3/26 |

FOREIGN PATENT DOCUMENTS

| EP | 0491131 A1 | 6/1992 |
| WO | 2013051373 A1 | 4/2013 |

OTHER PUBLICATIONS

Emadi et al., "Linear Variable Optical Filter-based Ultraviolet Microspectrometer," Applied Optics, Optical Society of America, Washington, DC, US, Jul. 2012, vol. 51(19), pp. 4308-4315, XP001576957, ISSN: 0003-6935, DOI: 10.1364/A0.51.004308, [retrieved on Jun. 22, 2012].
Extended European Search Report for Application No. EP22181641.6 mailed on Dec. 6, 2022, 8 pages.
Shaoda Zhang, et al.; "Mixed-gas CH4/CO2/CO detection based on linear variable optical filter and thermopile detector array"; Nanoscale Research Letters; 2019; pp. 1-9; 14:348; The Authors.

* cited by examiner

Primary Examiner — Jonathan Y Jung
(74) Attorney, Agent, or Firm — FOLEY & LARDNER LLP

(57) ABSTRACT

An optical filter includes a first mirror that has a first uniform thickness, a second mirror that has a second uniform thickness, and a spacer that is positioned between the first mirror and the second mirror. The spacer has a variable thickness along a first axis of the optical filter. In some implementations, a thickness profile of the spacer, along the first axis, includes one or more portions that have a non-linear slope with an absolute value that is greater than zero.

21 Claims, 12 Drawing Sheets

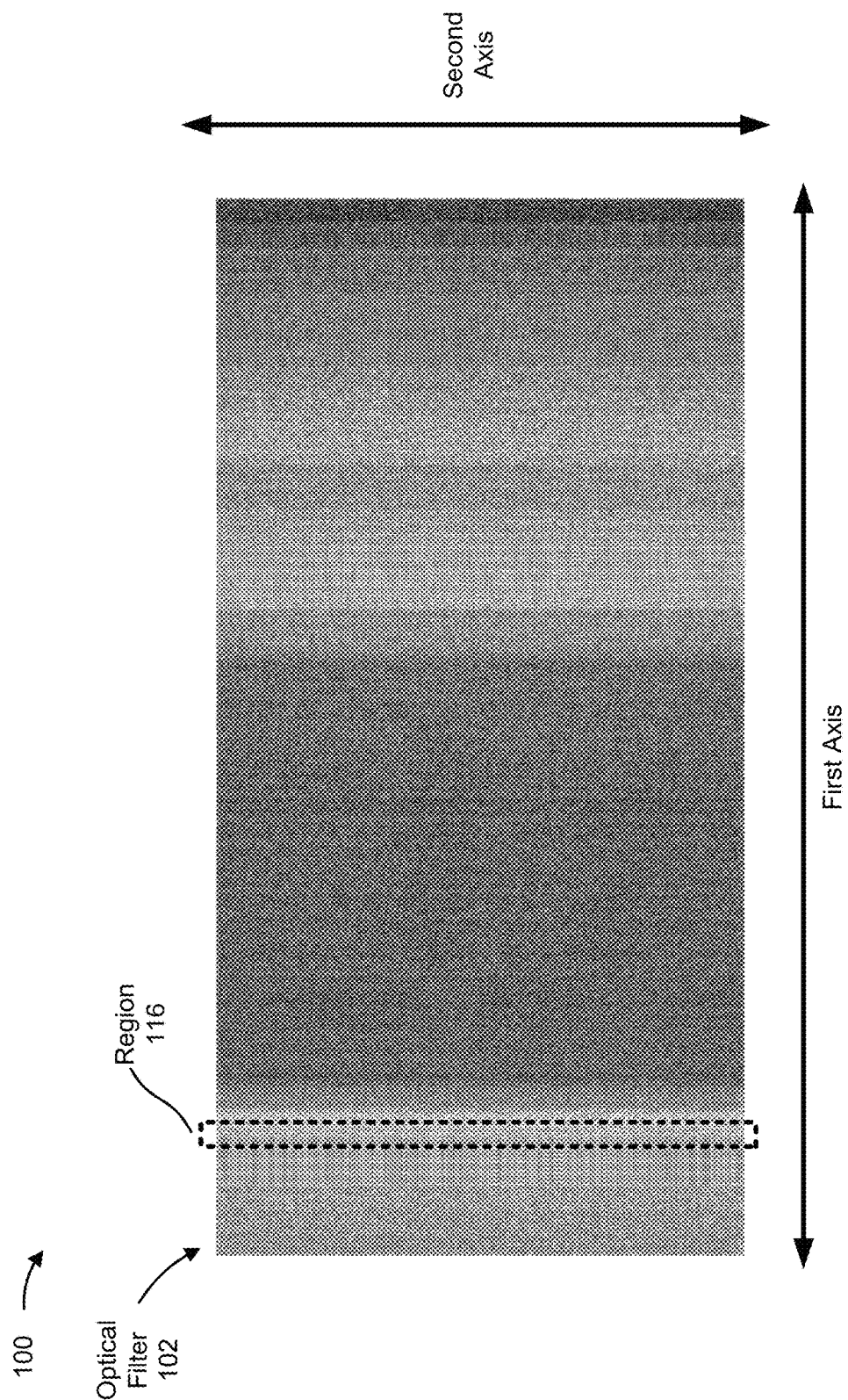

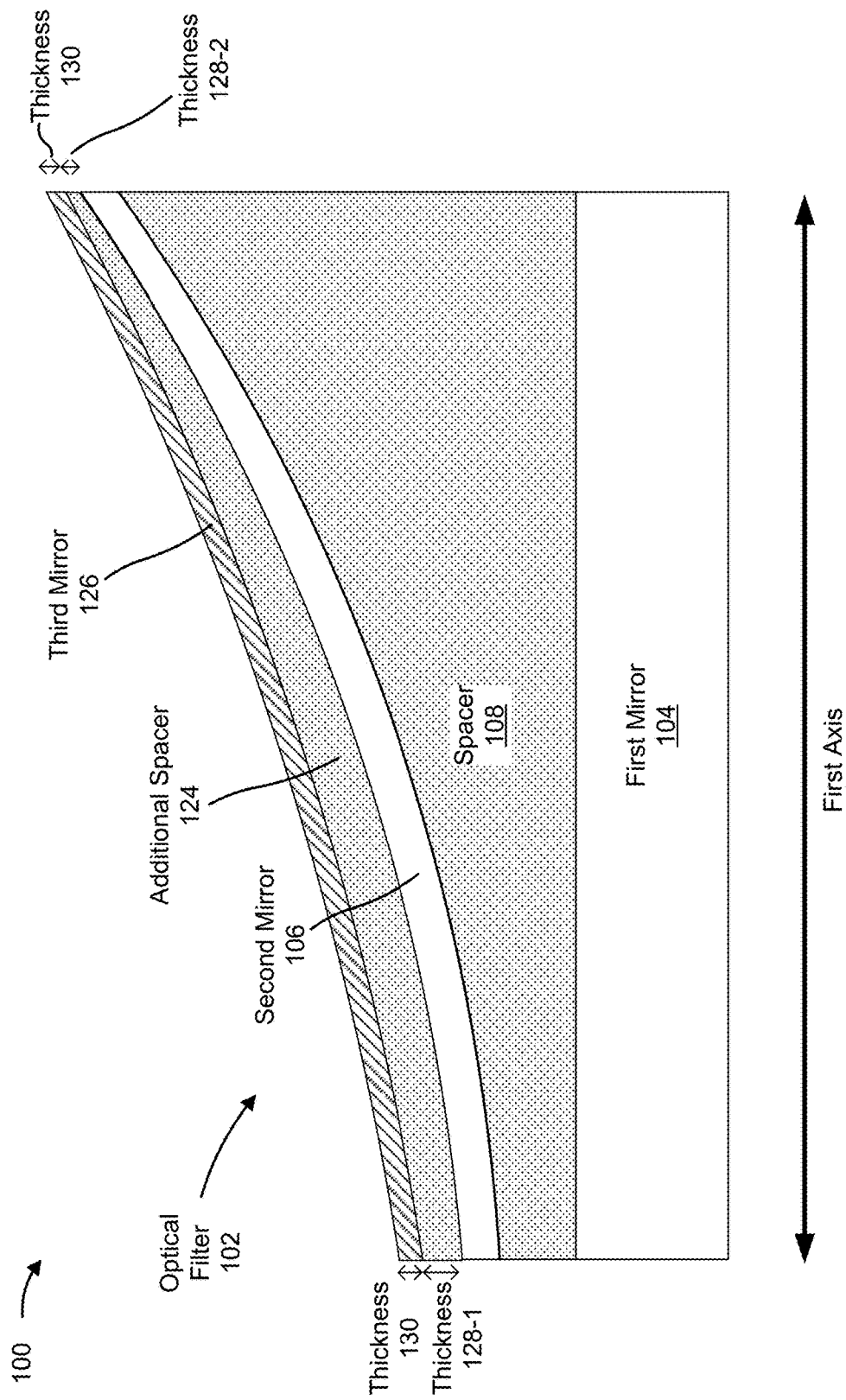

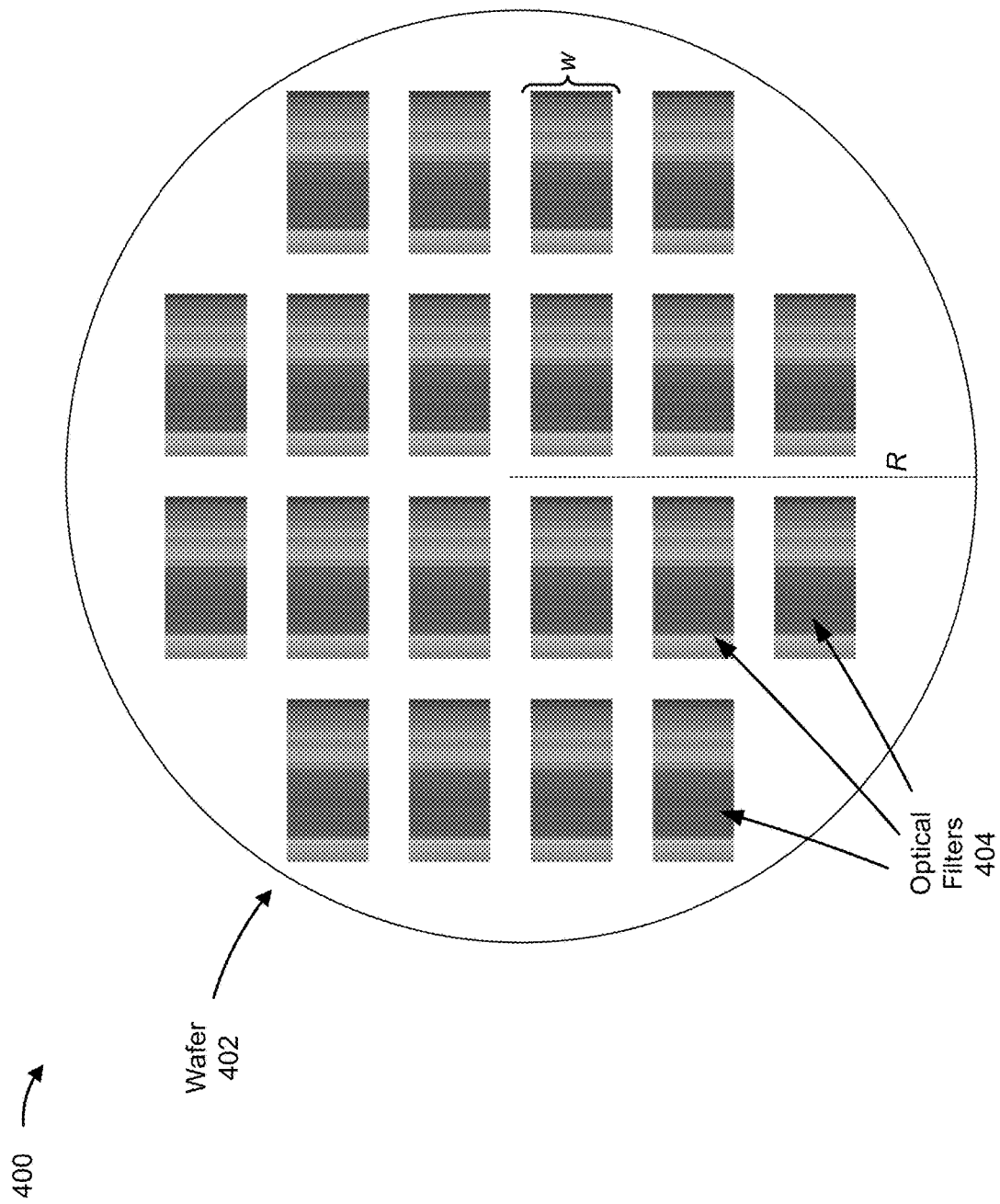

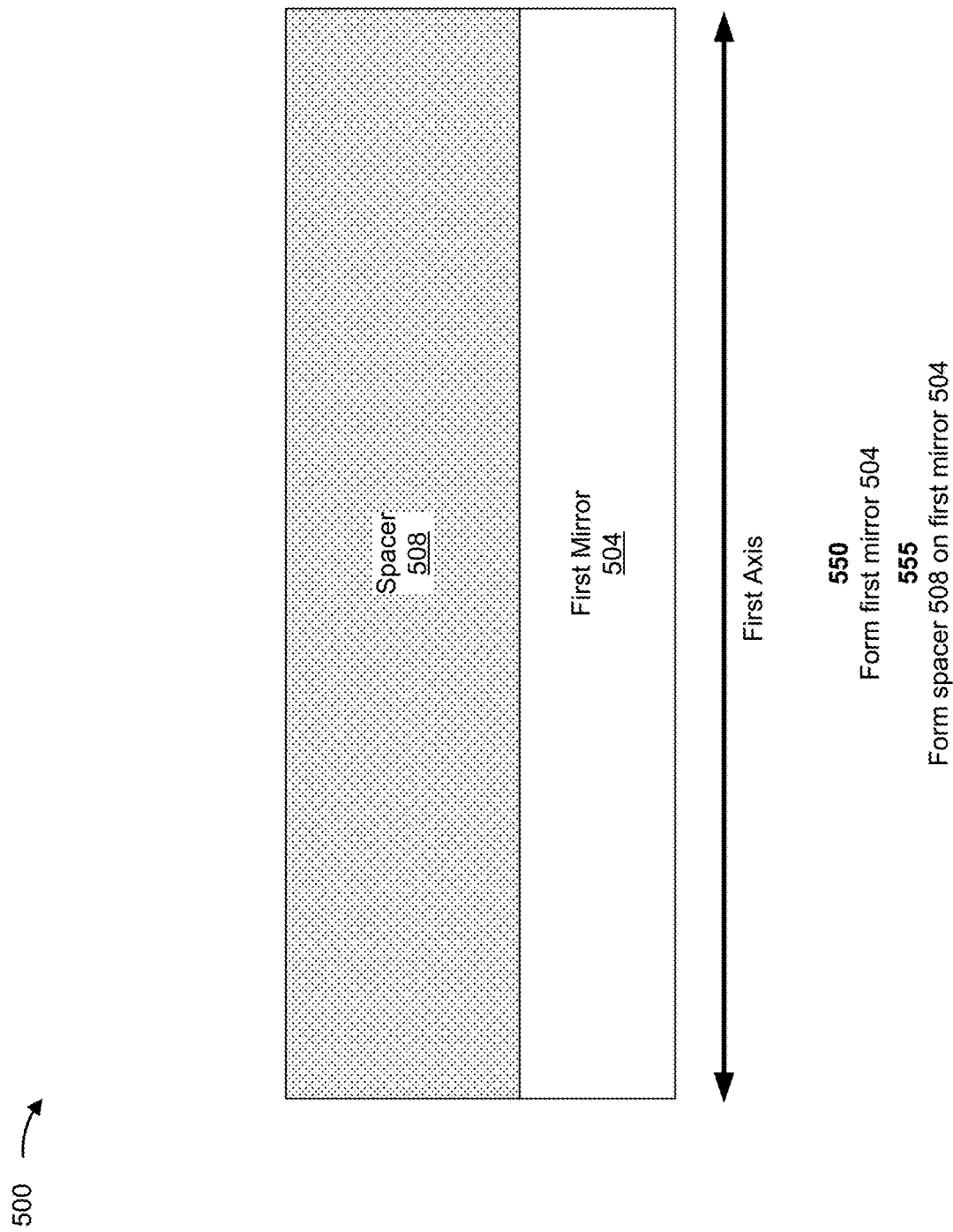

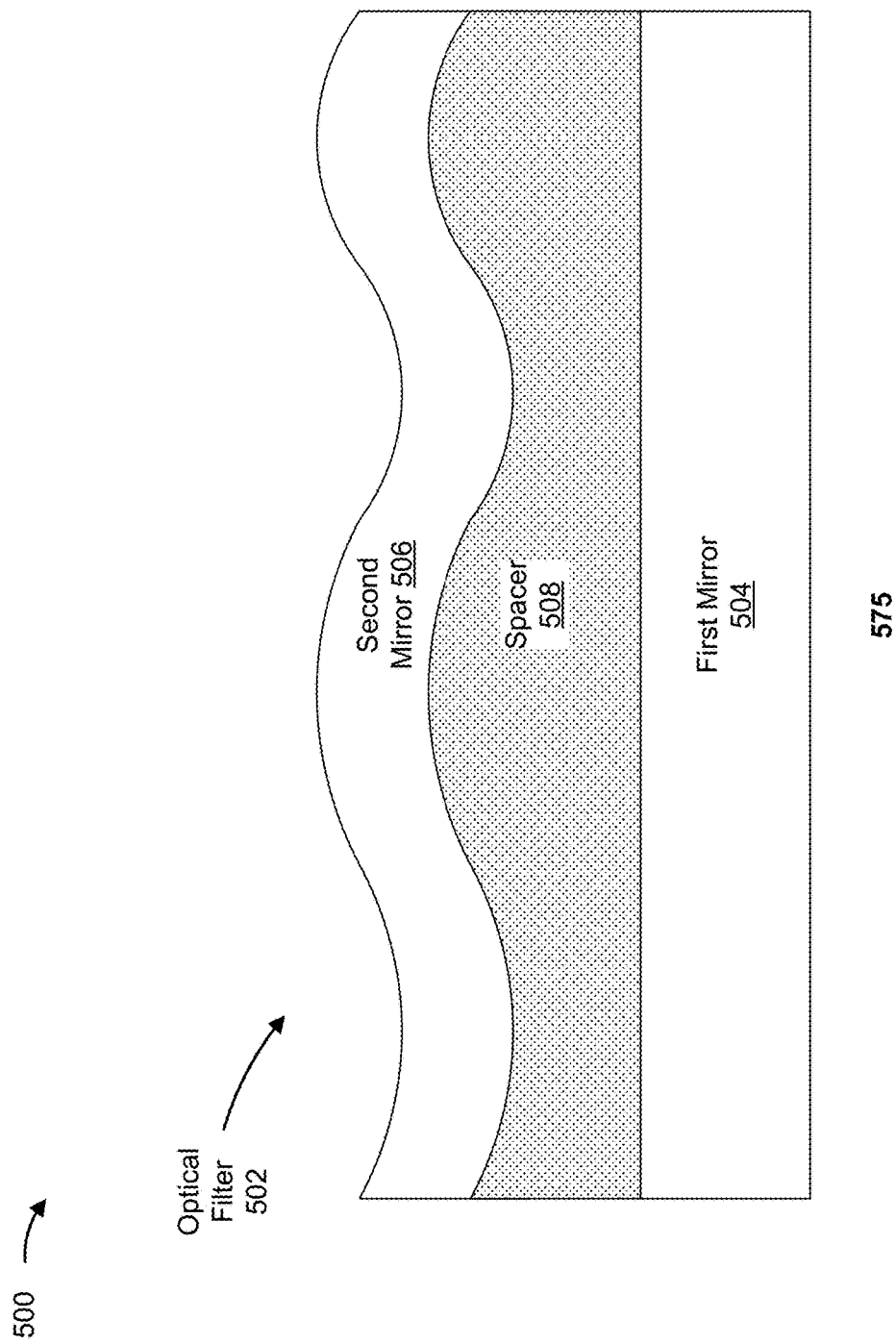

OPTICAL FILTER

BACKGROUND

An optical sensor device may be utilized to capture information. For example, the optical sensor device may capture information relating to a set of electromagnetic frequencies. The optical sensor device may include a set of sensor elements (e.g., optical sensors, spectral sensors, and/or image sensors) that capture the information. For example, an array of sensor elements may be utilized to capture information relating to multiple frequencies. The sensor element array may be associated with an optical filter. The optical filter may include one or more channels that respectively pass particular frequencies to sensor elements of the sensor element array.

SUMMARY

In some implementations, an optical filter includes a first mirror that has a first uniform thickness; a second mirror that has a second uniform thickness; and a spacer that is positioned between the first mirror and the second mirror, wherein the spacer has a variable thickness along a first axis of the optical filter and a thickness profile of the spacer, along the first axis, includes one or more portions that have a non-linear slope with an absolute value that is greater than zero.

In some implementations, a wafer includes a plurality of optical filters, wherein each optical filter includes: a first mirror that has a first uniform thickness; a second mirror that has a second uniform thickness; and a spacer that is positioned between the first mirror and the second mirror, wherein at least one of: the spacer has a variable thickness along a first axis of the optical filter, or a thickness profile of the spacer, along the first axis, includes one or more portions that have a non-linear slope with an absolute value that is greater than zero.

In some implementations, a method of manufacturing a plurality of optical filters comprises, for each optical filter: forming, on a region of a wafer, a first mirror; forming, on the first mirror, a spacer; forming an etch mask on the spacer; etching the etch mask and the spacer, wherein etching the etch mask eliminates the etch mask and etching the spacer causes the spacer to have a variable thickness along a first axis of the optical filter and a thickness profile of the spacer, along the first axis, to include one or more portions that have a non-linear slope with an absolute value that is greater than zero; and forming, on the spacer, a second mirror.

BRIEF DESCRIPTION OF THE DRAWINGS

FIGS. 1A-1D are diagrams of an example implementation described herein.

FIG. 4 is a diagram of an example implementation of a wafer described herein.

FIGS. 5A-5E are diagrams of an example implementation of a formation process for manufacturing an optical filter described herein.

DETAILED DESCRIPTION

Figure 1A:
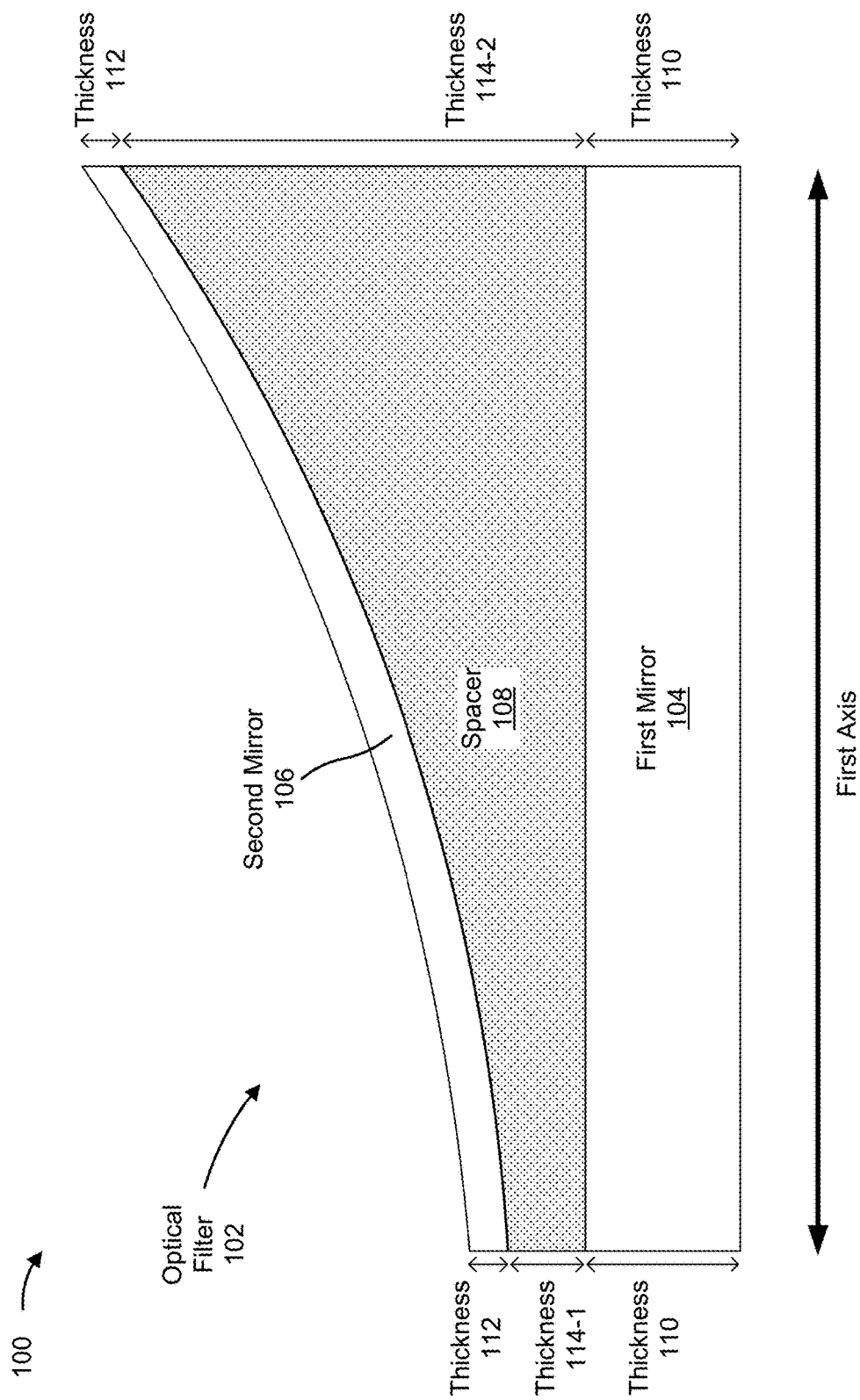

The following detailed description of example implementations refers to the accompanying drawings. The same reference numbers in different drawings may identify the same or similar elements. The following description uses a spectrometer as an example. However, the techniques, principles, procedures, and methods described herein may be used with any sensor, including but not limited to other optical sensors and spectral sensors.

A continuously variable filter (CVF) typically includes a first mirror with a variable thickness in a first direction of the CVF (e.g., a length of the CVF), a second mirror with a variable thickness in the first direction of the CVF, and a spacer with a variable thickness in the first direction of the CVF that is disposed between the first mirror and the second mirror. For example, the CVF may be "wedge-shaped," wherein respective thickness profiles of the first mirror, the second mirror, and the spacer have a linear slope (e.g., respective top surfaces of the first mirror, the second mirror, and the spacer can be described using one or more linear functions). In this way, when the CVF passes light associated with a plurality of spectral ranges, different regions (e.g., regions parallel to a second direction, a width, of the CVF) may pass respective spectral ranges of the plurality of spectral ranges.

In many cases, a CVF is formed using one or more physical deposition processes. However, such processes have limitations. For example, it is difficult to form mirrors with uniform thicknesses and to form a spacer with a thickness profile that has a non-linear slope. Consequently, forming a CVF to provide a particular spectral filtering performance (e.g., that requires mirrors with uniform thicknesses and/or a spacer with a thickness profile that has a non-linear slope) is not possible using the one or more physical deposition processes.

Further, the one or more physical deposition processes typically require multiple CVFs to be formed at a same time in an annular arrangement on a wafer (e.g., a circular wafer). Accordingly, after formation, each CVF has to be cut to have a particular shape (e.g., a rectilinear shape) and the CVFs have to further be compared to each other and processed to ensure that the CVFs provide a matching spectral filtering performance (e.g., across each of the CVFs). Further, forming the CVFs in the annular arrangement often results in a significant amount of a surface area of the wafer not being utilized to form CVFs and/or being deposited with material that ultimately will not be included in the CVFs (e.g., that will be cut and discarded to cause the CVFs to have rectilinear shapes).

Additionally, forming the CVFs in the annular arrangement results in each CVF having an "optical smile," wherein a region of the CVF (e.g., across a width of the CVF, in the second direction of the CVF) that is configured to pass a particular spectral range has significant variation in center wavelength associated with the spectral range across the region (e.g., different portions of the region pass light with different center wavelengths that are within the spectral range). In some cases, the variation can be defined as $$D \times R \times \left(1 - \sqrt{1 - \left[\left(\frac{W}{2}/R\right)\right]^2}\right),$$

where D is a linear slope of a thickness profile of the CVF, W is a width of the CVF (e.g., in the second direction), and R is a length of a coating tool arm (e.g., associated with a center of the wafer) that is associated with the one or more physical deposition processes. Accordingly, variation in center wavelength of the CVFs increases as the widths of the CVFs increase. This impacts a performance of each CVF (e.g., a finesse, a selectivity, and/or other characteristics of the CVF), which may prevent the CVFs from being used in particular applications (e.g., that require a consistent performance across the widths of the CVFs).

Some implementations described herein provide an optical filter. The optical filter includes a first mirror and a second mirror with respectively uniform thicknesses. The optical filter includes a spacer positioned between the first mirror and the second mirror, wherein the spacer has a variable thickness along a first axis of the optical filter (e.g., a length of the optical filter). Accordingly, the optical filter provides a spectral filtering performance (e.g., that requires mirrors with uniform thicknesses) that cannot be provided using a typical CVF (e.g., that is formed using conventional deposition processes). In some implementations, a thickness profile of the spacer, along the first axis, includes one or more portions that have a non-linear slope (e.g., with an absolute value that is greater than zero). In this way, the optical filter further provides a spectral filtering performance (e.g., that requires a thickness profile of the spacer that has a non-linear slope) that is not possible to be provided using the typical CVF.

Some implementations described herein provide a formation process for manufacturing the optical filter that includes using a sputtering procedure to create the first mirror and the second mirror, which enables the first mirror and the second mirror to have uniform thicknesses. Further, the formation process includes using a grayscale lithography procedure to form the spacer, which enables the thickness profile of the spacer, along the first axis, to include one or more portions that have a non-linear slope. The grayscale lithography procedure also enables the spacer to have a uniform thickness along the second axis, which reduces respective variations in center wavelength across regions of the optical filter that are parallel to the second axis of the optical filter (e.g., across width regions of the optical filter). This therefore minimizes an amount of optical smile associated with the optical filter, which improves a performance of the optical filter (e.g., a finesse, a selectivity, and/or other characteristics of the optical filter) as compared to a typical CVF. This allows the optical filter to be used in applications in which a typical CVF could not otherwise be used (e.g., applications that require a consistent performance across the width of the optical filter).

In some implementations, the formation process may be used to form a plurality of optical filters on a wafer (e.g., on respective regions of the wafer). The formation process enables each optical filter to be formed to have a particular shape (e.g., a rectilinear shape), without needing additional processing to resize the optical filter and match a spectral filtering performance of the optical filter with that of other optical filters formed on the wafer. Further, the formation process enables the plurality of optical filters to be formed in a non-annular arrangement on the wafer, which allows for an increased amount of a surface area of the wafer to be utilized to form CVFs and/or for a reduced amount of material that is discarded to form CVFs (e.g., as compared to conventional physical deposition processes).

FIGS. 1A-1D are diagram of an example implementation 100 described herein. As shown in FIGS. 1A-1D, the example implementation 100 may include an optical filter 102, such as for an optical sensor device (e.g., an optical sensor device 118, described herein). The optical sensor device may be a spectrometer device that performs spectroscopy, such as vibrational spectroscopy, near-infrared (NIR) spectroscopy, mid-infrared spectroscopy (mid-IR), and/or Raman spectroscopy.

In some implementations, the optical filter 102 may be configured to pass light associated with a plurality of spectral ranges of an electromagnetic spectrum (e.g., pass light with wavelengths that are within the plurality of spectral ranges). The plurality of spectral ranges may include, for example, one or more portions of an ultraviolet (UV) light spectral range (e.g., one or more portions of a spectral range within 100 to 379 nm), one or more portions of a visible light spectral range (e.g., one or more portions of a spectral range within 380 to 779 nm), one or more portions of an MR light spectral range (e.g., one or more portions of a spectral range within 780 to 1399 nm), one or more portions of short-wave infrared (SWIR) light spectral range (e.g., one or more portions of a spectral range within 1400 to 2999 nm), one or more portions of a mid-wave infrared (MWIR) light spectral range (e.g., one or more portions of a spectral range within 3000 to 7999 nm), and/or one or more portions of a long-wave infrared (LWIR) light spectral range (e.g., one or more portions of a spectral range within 8000 nm to 15000 nm).

As further shown in FIGS. 1A-1D, the optical filter may include a first mirror 104, a second mirror 106, and a spacer 108. The spacer 108 may be positioned between the first mirror 104 and the second mirror 106. For example, as further shown in FIGS. 1A and 1C-1D, the spacer 108 may be disposed on the first mirror 104 (e.g., a bottom surface of the spacer 108 may disposed on a top surface of the first mirror 104) and the second mirror 106 may be disposed on the spacer 108 (e.g., a bottom surface of the second mirror 106 may be disposed on top surface of the spacer 108).

Each mirror, of the first mirror 104 and the second mirror 106, may comprise one or more metals, one or more dielectric materials, and/or one or more semiconductor materials, among other examples. Each mirror may be configured to reflect one or more spectral ranges of the plurality of spectral ranges (e.g., reflect light with a wavelength that is within the one or more spectral ranges). For example, each mirror may be configured to reflect one or more spectral ranges associated with the one or more portions of the UV light spectral range, the one or more portions of the visible light spectral range, the one or more portions of the MR light spectral range, the one or more portions of the SWIR light spectral range, the one or more portions of the MWIR light spectral range, and/or the one or more portions of the LWIR light spectral range. In some implementations, the first mirror 104 and the second mirror 106 may each be configured to reflect light associated with a same spectral range of the plurality of spectral ranges. Additionally, or alternatively, the first mirror 104 may be configured to reflect light associated with a first spectral range of the plurality of spectral ranges and the second mirror 106 may be configured to reflect light associated with a second spectral range of the plurality of spectral ranges, where the second spectral range is different than the first spectral range (e.g., where at least a portion of the first spectral range does not overlap with the second spectral range, or vice versa).

The spacer 108 may comprise one or more materials, such as at least one of a silicon (Si) material, a hydrogenated silicon (Si:H) material, an amorphous silicon (a-Si) material, a silicon nitride (SiN) material, a germanium (Ge) material, a hydrogenated germanium (Ge:H) material, a silicon germanium (SiGe) material, a hydrogenated silicon germanium (SiGe:H) material, a silicon carbide (SiC) material, a hydrogenated silicon carbide (SiC:H) material, a silicon dioxide (SiO$_2$) material, a tantalum pentoxide (Ta$_2$O$_5$) material, a niobium pentoxide (Nb$_2$O$_5$) material, a niobium titanium oxide (NbTiO$_x$) material, a niobium tantalum pentoxide (Nb$_2$TaO$_5$) material, a titanium dioxide (TiO$_2$) material, an aluminum oxide (Al$_2$O$_3$) material, a zirconium oxide (ZrO$_2$) material, an yttrium oxide (Y$_2$O$_3$) material, an aluminum nitride (AlN), or a hafnium oxide (HfO$_2$) material, among other examples. The spacer 108 may be formed as a single spacer (e.g., rather than a spacer comprising discrete parts or layers). Additionally, or alternatively, the spacer 108 may have a uniform, or a substantially uniform, crystal lattice structure (e.g., the spacer 108 may not include any interfaces within the spacer 108). For example, the spacer 108 may be formed as a single spacer using an etching procedure (e.g., in coordination with a grayscale lithography procedure), as further described herein in relation to FIG. 5D. In some implementations, the spacer 108 may be configured to be transparent for the plurality of spectral ranges (e.g., that the optical filter 102 is configured to pass). For example, the spacer 108 may be configured to transmit greater than a threshold percentage of light that has a wavelength that is within the plurality of spectral ranges. The threshold percentage of light may be greater than or equal to 30%, 50%, 75%, 90%, 95%, and/or 99%, for example.

FIG. 1A illustrates a side view of an example configuration of the optical filter 102. As shown in FIG. 1A, the first mirror 104 may have a first uniform thickness 110 along a first axis (e.g., a horizontal axis as shown in FIG. 1A) of the optical filter 102 and the second mirror 106 may have a second uniform thickness 112 along the first axis. For example, the first uniform thickness 110 may vary by less than a first mirror thickness threshold along the first axis. The first mirror thickness threshold may be less than or equal to 1%, 2%, and/or 3% of a maximum thickness of the first uniform thickness 110, of a minimum thickness of the first uniform thickness 110, and/or of an average thickness of the first uniform thickness 110 (e.g., along some or all of the first axis), among other examples. As another example, the second uniform thickness 112 may vary by less than a second mirror thickness threshold along the first axis. The second mirror thickness threshold may be less than or equal to 1%, 2%, and/or 3% of a maximum thickness of the second uniform thickness 112, of a minimum thickness of second uniform thickness 112, and/or of an average thickness of second uniform thickness 112 (e.g., along some or all of the first axis), among other examples.

The spacer 108 may have a variable thickness 114 along the first axis. For example, the variable thickness 114 may vary by more than, or a same amount as, a spacer thickness threshold along the first axis. The spacer thickness threshold may be less than or equal to 1%, 2%, and/or 3% of a maximum thickness of the variable thickness 114, of a minimum thickness of the variable thickness 114, and/or of an average thickness of the variable thickness 114 (e.g., along some or all of the first axis), among other examples. In a particular example, as further shown in FIG. 1A, the spacer 108 may have a first variable thickness 114-1 at a first position (e.g., a first end position associated with a minimum thickness of the variable thickness 114) along the first axis, and a second variable thickness 114-2 at a second position (e.g., a second end position associated with a maximum thickness of the variable thickness 114) along the first axis. The spacer 108 therefore has a variable thickness along the first axis when a difference between the first variable thickness 114-1 and the second variable thickness 114-2 is greater than or equal to the spacer thickness threshold.

The spacer 108 may have a thickness profile (e.g., that is associated with the variable thickness 114) along the first axis of the optical filter 102. In some implementations, one or more portions of the thickness profile may have a non-linear slope (e.g., for each portion, of the one or more portions, a slope of a top surface of the spacer 108 may not be linear). For example, as shown in FIG. 1A, the top surface of the spacer 108 has a curved surface (e.g., that can be described using a nonlinear function, not a linear function). Accordingly, any one portion of the thickness profile of the spacer 108 (as shown in FIG. 1A) has a non-linear slope. Additionally, in some implementations, one or more portions of the thickness profile may have a non-linear slope with an absolute value that is greater than zero. For example, any one portion of the thickness profile of the spacer 108 may have a non-linear slope that does not include a sub-portion that is parallel to the first axis (e.g., the top surface of the spacer 108 does not include a horizontal sub-portion). Further description regarding thickness profiles is provided herein in relation to FIGS. 2-3.

In some implementations, the optical filter 102 may include one or more blocking components (not shown in FIG. 1A). The one or more blocking components may absorb, reflect, and/or or otherwise prevent light not associated with the plurality of spectral ranges (e.g., that the optical filter 102 is configured to pass) from passing through the optical filter 102. For example, a blocking component may prevent passage, by the optical filter 102, of light with wavelengths that are not within the plurality of spectral ranges. The one or more blocking components may be disposed on at least one of the first mirror 104, the spacer 108, or the second mirror 106. For example, with reference to FIG. 1A, the one or more blocking components may be disposed on a bottom surface of the first mirror 104, a top surface of the first mirror 104 and/or a bottom surface of the spacer 108, a top surface of the spacer 108 and/or a bottom surface of the second mirror 106, and/or a top surface of the second mirror 106.

FIG. 1B illustrates a top view of the optical filter 102. As shown in FIG. 1B, a second axis (e.g., a vertical axis) of the optical filter 102 may be orthogonal to the first axis (e.g., the horizontal axis) of the optical filter 102. The first axis may be associated with a "length" of the optical filter 102 and the second axis may be associated with a "width" of the optical filter 102.

The optical filter 102 may be configured to pass light associated with a spectral range, of the plurality of spectral ranges (e.g., that the optical filter 102 is configured to pass), across a region of the optical filter that is parallel to the second axis. For example, as further shown in FIG. 1B, the optical filter 102 may include a region 116 that is parallel to the second axis (e.g., the region 116 is a "width" region along a top surface of the optical filter 102 that is parallel to the second axis) and that is configured to pass light associated with a particular spectral range. In some implementations, a variation in center wavelength associated with the spectral range across the region (e.g., at one or more positions across the region, as shown in FIG. 1B) may satisfy (e.g., be less than or equal to) a center wavelength variation threshold. The center wavelength variation threshold may be less than or equal to 1%, 2%, and/or 3% a width of the spectral range (e.g., a difference between a maximum of the spectral range and a minimum of the spectral range) and/or less than or equal to 1 nm, 2 nm, 3 nm, and/or another length. In this way, the optical filter 102 may have a reduced amount of optical smile.

Figure 1C:
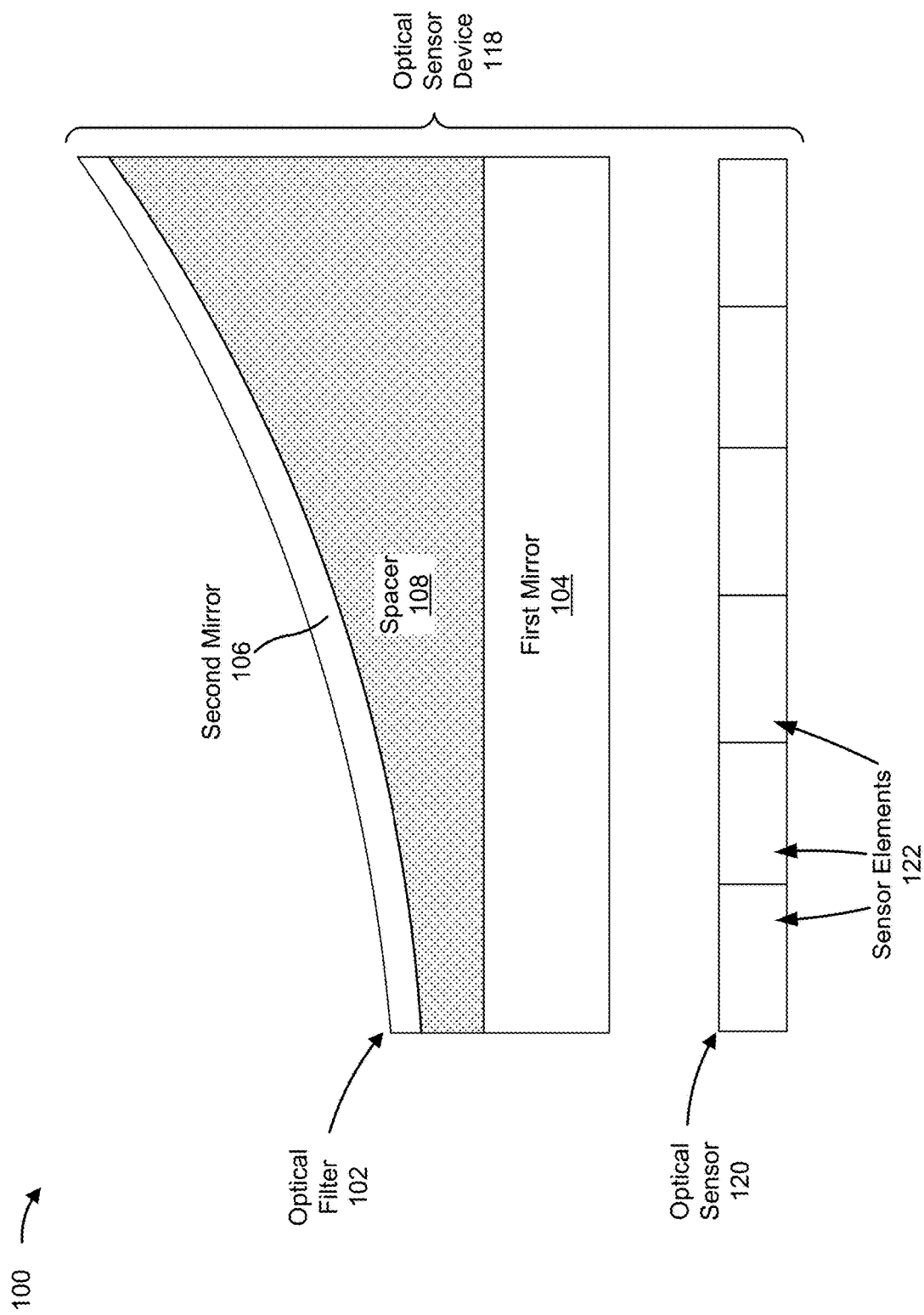

FIG. 1C illustrates a side view of an example optical sensor device 118 that includes the optical filter 102 and an optical sensor 120. The optical sensor 120 may be capable of sensing light. For example, the optical sensor 120 may include an image sensor, a multispectral sensor, a spectral sensor, and/or similar sensor. In some implementations, the optical sensor 120 may include a silicon (Si) based sensor, an indium-gallium-arsenide (InGaAs) based sensor, a lead-sulfide (PbS) based sensor, or a germanium (Ge) based sensor, and may utilize one or more sensor technologies, such as a complementary metal-oxide-semiconductor (CMOS) technology, or a charge-coupled device (CCD) technology, among other examples. In some implementations, the optical sensor 120 may include a front-side illumination (FSI) sensor, a back-side illumination (BSI) sensor, and/or another sensors.

As further shown in FIG. 1C, the optical sensor 120 may include a plurality of sensor elements 122. The plurality of sensor elements 122 may be arranged in a one-dimensional array, a two-dimensional array, and/or another arrangement on a surface of the optical sensor 120. In some implementations, the optical filter 102 may be configured to pass light associated with the plurality of spectral ranges to the plurality of sensor elements 122. A sensor element 122 may be configured to obtain information regarding light that falls incident on the sensor element 122 (e.g., after passing through a portion of the optical filter 102). For example, a sensor element 122 may provide an indication of intensity of light that falls incident on the sensor element 122 (e.g., active/inactive, or a more granular indication of intensity). The optical sensor 120 may be configured to collect the information obtained by the one or more sensor elements 122 to generate sensor data.

As further shown in FIG. 1C, the optical filter 102 may be disposed over the optical sensor 120 in the optical sensor device 118. The optical filter 102 may be directly disposed on the optical sensor 120 or may be separated from the optical sensor 120 by a gap (e.g., a free space gap).

FIG. 1D illustrates a side view of another example configuration of the optical filter 102, wherein the optical filter 102 includes the first mirror 104, the second mirror 106, and the spacer 108 (e.g., as described herein in relation to FIGS. 1A-1C), along with an additional spacer 124 and a third mirror 126. The additional spacer 124 may be positioned between the second mirror 106 and the third mirror 126. For example, as further shown in FIG. 1D, the additional spacer 124 may be disposed on the second mirror 106 (e.g., a bottom surface of the additional spacer 124 may disposed on a top surface of the second mirror 106) and the third mirror 126 may be disposed on the additional spacer 124 (e.g., a bottom surface of the second mirror 106 may be disposed on a top surface of the additional spacer 124).

The additional spacer 124 may be configured in a same, or similar manner, as the spacer 108. For example, the additional spacer 124 may comprise one or more materials, such as at least one of an Si material, an Si:H material, an a-Si material, an SiN material, a Ge material, a Ge:H material, an SiGe material, an SiGe:H material, an SiC material, an SiC:H material, an $SiO_2$ material, a $Ta_2O_5$ material, a $Nb_2O_5$ material, a $NbTiO_x$ material, a $Nb_2TaO_5$ material, a $TiO_2$ material, an $Al_2O_3$ material, a $ZrO_2$ material, an $Y_2O_3$ material, an MN material, or a $HfO_2$ material, among other examples. The additional spacer 124 may be formed as a single spacer (e.g., rather than a spacer comprising discrete parts or layers). Additionally, or alternatively, the additional spacer 124 may have a uniform, or a substantially uniform, crystal lattice structure (e.g., the additional spacer 124 may not include any interfaces within the additional spacer 124). For example, the additional spacer 124 may be formed as a single spacer using an etching procedure (e.g., in coordination with a grayscale lithography procedure), in a similar manner as described herein in relation to FIG. 5D. In some implementations, the additional spacer 124 may be configured to be transparent for the plurality of spectral ranges (e.g., that the optical filter 102 is configured to pass). For example, the additional spacer 124 may be configured to transmit greater than a threshold percentage of light that has a wavelength that is within the plurality of spectral ranges. The threshold percentage of light may be greater than or equal to 30%, 50%, 75%, 90%, 95%, and/or 99%, for example.

As further shown in FIG. 1D, the additional spacer 124 may have a variable thickness 128 along the first axis (e.g., the horizontal axis as shown in FIG. 1D). For example, the variable thickness 114 may vary by more than, or a same amount as, an additional spacer thickness threshold along the first axis. The additional spacer thickness threshold may be less than or equal to 1%, 2%, and/or 3% of a maximum thickness of the variable thickness 128, of a minimum thickness of the variable thickness 128, and/or of an average thickness of the variable thickness 128 (e.g., along some or all of the first axis), among other examples. In a particular example, as further shown in FIG. 1D, the additional spacer 124 may have a first variable thickness 128-1 at a first position (e.g., a first end position associated with a maximum thickness of the variable thickness 128) along the first axis and a second variable thickness 128-2 at a second position (e.g., a second end position associated with a minimum thickness of the variable thickness 128) along the first axis. The additional spacer 124 therefore has a variable thickness along the first axis when a difference between the first variable thickness 128-1 and the second variable thickness 128-2 is greater than or equal to the spacer thickness threshold.

As further shown in FIG. 1D, the additional spacer 124 may have a thickness profile (e.g., that is associated with the variable thickness 128) along the first axis of the optical filter 102. In some implementations, one or more portions of the thickness profile may have a non-linear slope (e.g., for each portion, of the one or more portions, a slope of a top surface of additional spacer 124 may not be linear). For example, as shown in FIG. 1D, the top surface of additional spacer 124 has a curved surface (e.g., that can be described using an exponential function, not a linear function). Accordingly, any one portion of the thickness profile of the additional spacer 124 (as shown in FIG. 1D) has a non-linear slope. As further shown in FIG. 1D, the one or more portions of the thickness profile may have a non-linear slope with an absolute value that is greater than zero (e.g., for each portion, of the one or more portions, a slope of a top surface of additional spacer 124 is not parallel to the first axis). Further description regarding thickness profiles is provided herein in relation to FIGS. 2-3.

The third mirror 126 may be configured in a same, or similar manner, as the first mirror 104 and/or the second mirror 106. For example, the third mirror 126 may comprise one or more metals, one or more dielectric materials, and/or one or more semiconductor materials, among other examples. The third mirror 126 may be configured to reflect one or more spectral ranges of the plurality of spectral ranges. The third mirror 126 may be configured to reflect light associated with a same spectral range as that reflected by the first mirror 104 and/or the second mirror 106. Additionally, or alternatively, the third mirror 126 may be configured to reflect light associated with a different spectral range than that reflected by the first mirror 104 and/or the second mirror 106.

As further shown in FIG. 1D, the third mirror 162 may have a third uniform thickness 130 along the first axis (e.g., the horizontal axis as shown in FIG. 1D) of the optical filter 102. For example, the third uniform thickness 130 may vary by less than a third mirror thickness threshold along the first axis. The third mirror thickness threshold may be less than or equal to 1%, 2%, and/or 3% of a maximum thickness of the third uniform thickness 130, of a minimum thickness of the third uniform thickness 130, and/or of an average thickness of the third uniform thickness 130 (e.g., along some or all of the first axis), among other examples.

As indicated above, FIGS. 1A-1D are provided as an example. Other examples may differ from what is described with regard to FIGS. 1A-1D.

Figure 2:
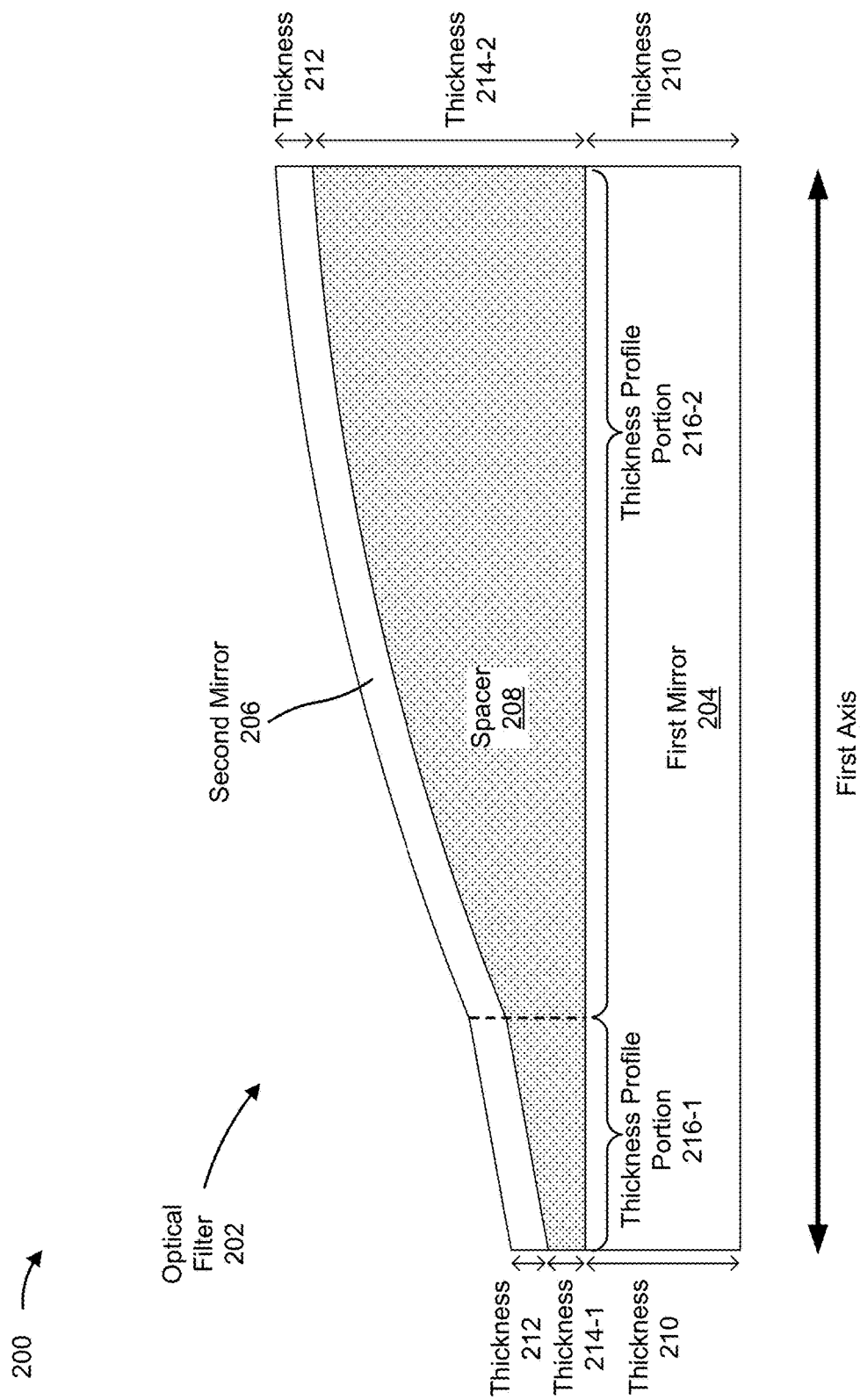
FIG. 2 is a diagram of an example implementation of an optical filter described herein.

FIG. 2 is a diagram of an example implementation 200 of an optical filter 202. As shown in FIG. 2, the optical filter may include a first mirror 204, a second mirror 206, and a spacer 208. The first mirror 204, the second mirror 206, and the spacer 208 may be respectively configured in a same, or similar, manner as that of the first mirror 104, the second mirror 106, and the spacer 108 of the optical filter 102 described herein in relation to FIGS. 1A-1D. In some implementations, the optical filter 202 may include one or more blocking components (not shown in FIG. 2) that are configured in a same, or similar manner, as that of the one or more blocking components described herein in relation to FIGS. 1A-1D.

FIG. 2 illustrates a side view of an example configuration of the optical filter 202. As shown in FIG. 2, the first mirror 204 may have a first uniform thickness 210 along a first axis (e.g., a horizontal axis as shown in FIG. 2) of the optical filter 202 and the second mirror 206 may have a second uniform thickness 212 along the first axis. For example, the first uniform thickness 210 may vary by less than a first mirror thickness threshold along the first axis. The first mirror thickness threshold may be less than or equal to 1%, 2%, and/or 3% of a maximum thickness of the first uniform thickness 210, of a minimum thickness of the first uniform thickness 210, and/or of an average thickness of the first uniform thickness 210 (e.g., along some or all of the first axis), among other examples. As another example, the second uniform thickness 212 may vary by less than a second mirror thickness threshold along the first axis. The second mirror thickness threshold may be less than or equal to 1%, 2%, and/or 3% of a maximum thickness of the second uniform thickness 212, of a minimum thickness of second uniform thickness 212, and/or of an average thickness of second uniform thickness 212 (e.g., along some or all of the first axis), among other examples.

The spacer 208 may have a variable thickness 214 along the first axis. For example, the variable thickness 214 may vary by more than, or a same amount as, a spacer thickness threshold along the first axis. The spacer thickness threshold may be less than or equal to 1%, 2%, and/or 3% of a maximum thickness of the variable thickness 214, of a minimum thickness of the variable thickness 214, and/or of an average thickness of the variable thickness 214 (e.g., along some or all of the first axis), among other examples. In a particular example, as further shown in FIG. 2, the spacer 208 may have a first variable thickness 214-1 at a first position (e.g., a first end position associated with a minimum thickness of the variable thickness 214) along the first axis and a second variable thickness 214-2 at a second position (e.g., a second end position associated with a maximum thickness of the variable thickness 214) along the first axis. The spacer 208 therefore has a variable thickness along the first axis when a difference between the first variable thickness 214-1 and the second variable thickness 214-2 is greater than or equal to the spacer thickness threshold.

The spacer 208 may have a thickness profile (e.g., that is associated with the variable thickness 214) along the first axis of the optical filter 202. In some implementations, one or more portions 216 of the thickness profile may have a non-linear slope (e.g., for each portion, of the one or more portions, a slope of a top surface of the spacer 208 may not be linear). For example, as shown in FIG. 2, a portion of the top surface of the spacer 208 associated with a thickness profile portion 216-1 of the thickness profile has a linear slope (e.g., that can be described using a linear function) and another portion of the top surface of the spacer 208 associated with a thickness profile portion 216-2 of the thickness profile has a non-linear slope (e.g., that can be described using one or more exponential functions, not linear functions). As further shown in FIG. 2, the thickness profile portion 216-2 has a non-linear slope with an absolute value that is greater than zero (e.g., a top surface of the spacer 208 does not include a horizontal sub-portion).

As indicated above, FIG. 2 is provided as an example. Other examples may differ from what is described with regard to FIG. 2.

Figure 3:
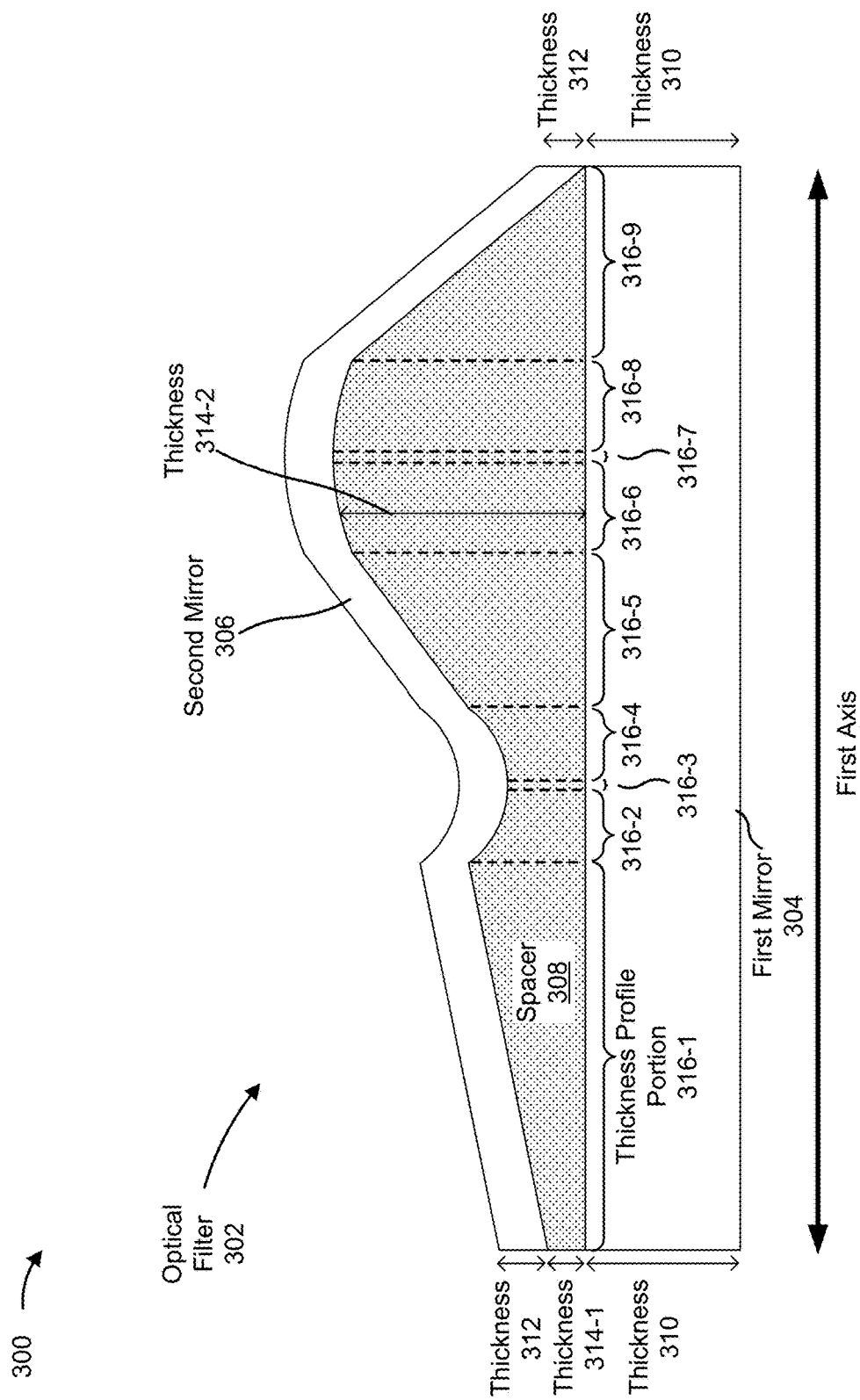
FIG. 3 is a diagram of an example implementation of an optical filter described herein.

FIG. 3 is a diagram of an example implementation 300 of an optical filter 302. As shown in FIG. 3, the optical filter may include a first mirror 304, a second mirror 306, and a spacer 308. The first mirror 304, the second mirror 306, and the spacer 308 may be respectively configured in a same, or similar, manner as that of the first mirror 104, the second mirror 106, and the spacer 108 of the optical filter 102 described herein in relation to FIGS. 1A-1D. In some implementations, the optical filter 302 may include one or more blocking components (not shown in FIG. 3) that are configured in a same, or similar manner, as that of the one or more blocking components described herein in relation to FIGS. 1A-1D.

FIG. 3 illustrates a side view of an example configuration of the optical filter 302. As shown in FIG. 3, the first mirror 304 may have a first uniform thickness 310 along a first axis (e.g., a horizontal axis as shown in FIG. 3) of the optical filter 302 and the second mirror 306 may have a second uniform thickness 312 along the first axis. For example, the first uniform thickness 310 may vary by less than a first mirror thickness threshold along the first axis. The first mirror thickness threshold may be less than or equal to 1%, 2%, and/or 3% of a maximum thickness of the first uniform thickness 310, of a minimum thickness of the first uniform thickness 310, and/or of an average thickness of the first uniform thickness 310 (e.g., along some or all of the first axis), among other examples. As another example, the second uniform thickness 312 may vary by less than a second mirror thickness threshold along the first axis. The second mirror thickness threshold may be less than or equal to 1%, 2%, and/or 3% of a maximum thickness of the second uniform thickness 312, of a minimum thickness of second uniform thickness 312, and/or of an average thickness of second uniform thickness 312 (e.g., along some or all of the first axis), among other examples.

The spacer 308 may have a variable thickness 314 along the first axis. For example, the variable thickness 314 may vary by more than, or a same amount as, a spacer thickness threshold along the first axis. The spacer thickness threshold may be less than or equal to 1%, 2%, and/or 3% of a maximum thickness of the variable thickness 314, of a minimum thickness of the variable thickness 314, and/or of an average thickness of the variable thickness 314 (e.g., along some or all of the first axis), among other examples. In a particular example, as further shown in FIG. 3, the spacer 308 may have a first variable thickness 314-1 at a first position (e.g., a first end position associated with a minimum thickness of the variable thickness 314) along the first axis and a second variable thickness 314-2 at a second position (e.g., a middle position associated with a maximum thickness of the variable thickness 314) along the first axis. The spacer 308 therefore has a variable thickness along the first axis when a difference between the first variable thickness 314-1 and the second variable thickness 314-2 is greater than or equal to the spacer thickness threshold.

The spacer 308 may have a thickness profile (e.g., that is associated with the variable thickness 314) along the first axis of the optical filter 302. In some implementations, one or more portions 316 of the thickness profile may have a non-linear slope (e.g., for each portion, of the one or more portions, a slope of a top surface of the spacer 308 may not be linear). Additionally, in some implementations, the one or more portions 316 of the thickness profile may have a non-linear slope with an absolute value that is greater than zero (e.g., a top surface of the spacer 308 is not horizontal). For example, as shown in FIG. 3, a first portion of the top surface of the spacer 308 associated with a thickness profile portion 316-1 of the thickness profile has a linear slope (e.g., that can be described using a linear function); a second portion of the top surface of the spacer 308 associated with a thickness profile portion 316-2 of the thickness profile has a non-linear slope (e.g., that can be described using one or more exponential functions, not linear functions) with an absolute value that is greater than zero (e.g., that is not horizontal); a third portion of the top surface of the spacer 308 associated with a thickness profile portion 316-3 of the thickness profile has a non-linear slope, but with an absolute value that is equal to zero (e.g., a portion of the top surface of the spacer 308 is horizontal); a fourth portion of the top surface of the spacer 308 associated with a thickness profile portion 316-4 of the thickness profile has a non-linear slope with an absolute value that is greater than zero; a fifth portion of the top surface of the spacer 308 associated with a thickness profile portion 316-5 of the thickness profile has a linear slope; a sixth portion of the top surface of the spacer 308 associated with a thickness profile portion 316-6 of the thickness profile has a non-linear slope with an absolute value that is greater than zero; a seventh portion of the top surface of the spacer 308 associated with a thickness profile portion 316-7 of the thickness profile has a non-linear slope, but with an absolute value that is equal to zero (e.g., a portion of the top surface of the spacer 308 is horizontal); an eighth portion of the top surface of the spacer 308 associated with a thickness profile portion 316-8 of the thickness profile has a non-linear slope with an absolute value that is greater than zero; and a ninth portion of the top surface of the spacer 308 associated with a thickness profile portion 316-9 of the thickness profile has a linear slope.

As indicated above, FIG. 3 is provided as an example. Other examples may differ from what is described with regard to FIG. 3.

FIG. 4 is a diagram of an example implementation 400 of a wafer 402. The wafer 402 may include a silicon (Si) wafer, a gallium arsenide (GaAs) wafer, an indium phosphide (InP) wafer, a germanium (Ge) wafer, and/or another type of wafer. As shown in FIG. 4, a plurality of optical filters 404 may be disposed on the wafer 402 (e.g., formed on the wafer 402 using a formation process described herein in relation to FIGS. 5A-5E).

Each of the plurality of optical filters 404 (e.g., after completion of the formation process) may be configured in a same, or similar, manner as that of the optical filters 102, 202, and 302 described herein in relation to FIGS. 1A-1D, 2, and 3. For example, each optical filter 404, of the plurality of optical filters 404 may include a first mirror (e.g., that has a first uniform thickness), a second mirror (e.g., that has a second uniform thickness), and a spacer that is positioned between the first mirror and the second mirror. The spacer may have a variable thickness along a first axis of the optical filter, and/or a thickness profile of the spacer, along the first axis, may include one or more portions that have a non-linear slope (e.g., a non-linear slope with an absolute value greater than zero, as described elsewhere herein). Accordingly, each optical filter 404 may be configured to provide a matching spectral filtering performance (e.g., the plurality of optical filters 404 may each pass light associated with a same plurality of spectral ranges, and corresponding portions of the plurality of optical filters 404 may pass light associated with a same particular spectral range of the plurality of spectral ranges).

In some implementations, the plurality of optical filters 404 may be formed on the wafer 402 with minimal optical smile. For example, each optical filter 404 may include a region that is parallel to a second axis of the optical filter 404 (e.g., like a region 116 of the optical filter 102, as shown in FIG. 1B), wherein the second axis is orthogonal to the first axis of the optical filter 404. The region of the optical filter may be configured to pass light associated with a spectral range (e.g., of the plurality of spectral ranges), and a variation in center wavelength associated with the spectral range across the region may satisfy (e.g., be less than or equal to) a center wavelength variation threshold (e.g., as described elsewhere herein). Accordingly, the region may provide a consistent spectral performance across the region (e.g., one or more portions of the region may each pass light associated with the spectral range with a substantially same center wavelength).

As further shown in FIG. 4, the plurality of optical filters 404 may be disposed on the wafer 402 to utilize an optimal amount of a surface area of the wafer 402. Accordingly, a particular number of optical filters 404 may be formed on the wafer 402 (e.g., using the formation process described herein in relation to FIGS. 5A-5E), such as to optimally utilize the surface area of the wafer. The particular number may be greater than or equal to $2\pi R/w$, where R is a radius of the wafer 402 and w is a width of each optical filter 404 (e.g., along the second axis of the optical filter 404).

As indicated above, FIG. 4 is provided as an example. Other examples may differ from what is described with regard to FIG. 4.

FIGS. 5A-5E are diagrams of an example implementation 500 of a formation process for manufacturing an optical filter 502 (e.g., an optical filter that is the same as, or similar to, the optical filters 102, 202, 302, and/or 404, described herein in relation to FIGS. 1A-1D, and 2-4). As shown in FIGS. 5A-5E, the optical filter 502 may be formed by forming a first mirror 504 (e.g., that is the same as, or similar to, the first mirror 104, the first mirror 204, and/or the first mirror 304 described herein in relation to FIGS. 1A-1D, 2, and 3), a spacer 508 (e.g., that is the same as, or similar to, the spacer 108, the spacer 208, and/or the spacer 308 described herein in relation to FIGS. 1A-1D, 2, and 3), a second mirror 506 (e.g., that is the same as, or similar to, the second mirror 106, the second mirror 206, and/or the second mirror 306 described herein in relation to FIGS. 1A-1D, 2, and 3). In some implementations, one or more layers and/or structures may be fabricated using a sputtering procedure, a photolithographic procedure, a grayscale lithographic procedure, an etching procedure, a lift off procedure, a scraping procedure, an annealing procedure, a molding procedure, a casting procedure, a machining procedure, and/or a stamping procedure, among other examples.

As shown in FIG. 5A, and by reference number 550, the formation process may include forming the first mirror 504. For example, the formation process may include forming the first mirror 504 on a region of a wafer (not shown in FIG. 5A) (e.g., a region of the wafer 402). As further shown in FIG. 5A, the first mirror 504 may be formed with a uniform thickness along a first axis of the optical filter 502 (e.g., the uniform thickness of the first mirror 504 may vary by less than a first mirror thickness threshold along the first axis, as described elsewhere herein).

As further shown in FIG. 5A, and by reference number 555, the formation process may include forming the spacer 508 on the first mirror 504. For example, the formation process may include forming the spacer 508 on a top surface of the first mirror 504. As further shown in FIG. 5A, the spacer 508 may be formed with a uniform thickness along the first axis (e.g., the uniform thickness of the spacer 508 may vary by less than a spacer thickness threshold along the first axis).

Figure 5B:
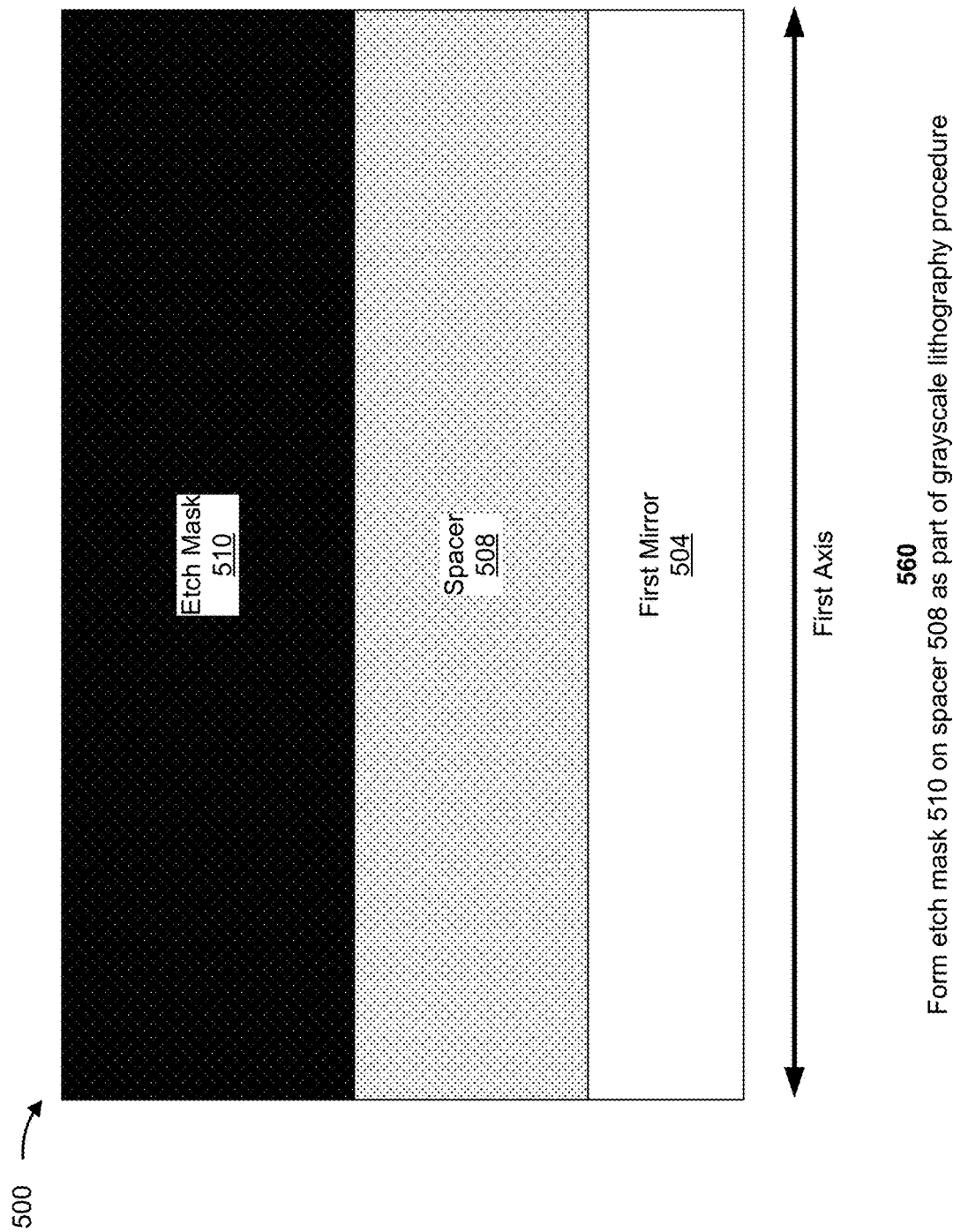

As further shown in FIG. 5B, and by reference number 560, the formation process may include forming an etch mask 510 on the spacer 508. The etch mask 510 may comprise a photo-sensitive material, such as a photo-sensitive polymer. In some implementations, the etch mask 510 may be formed using a grayscale lithography procedure, such as a grayscale electron beam lithography procedure or a grayscale photolithography procedure. For example, when using the grayscale lithography procedure, the formation process may include depositing the etch mask 510 on the spacer 508.

Figure 5C:
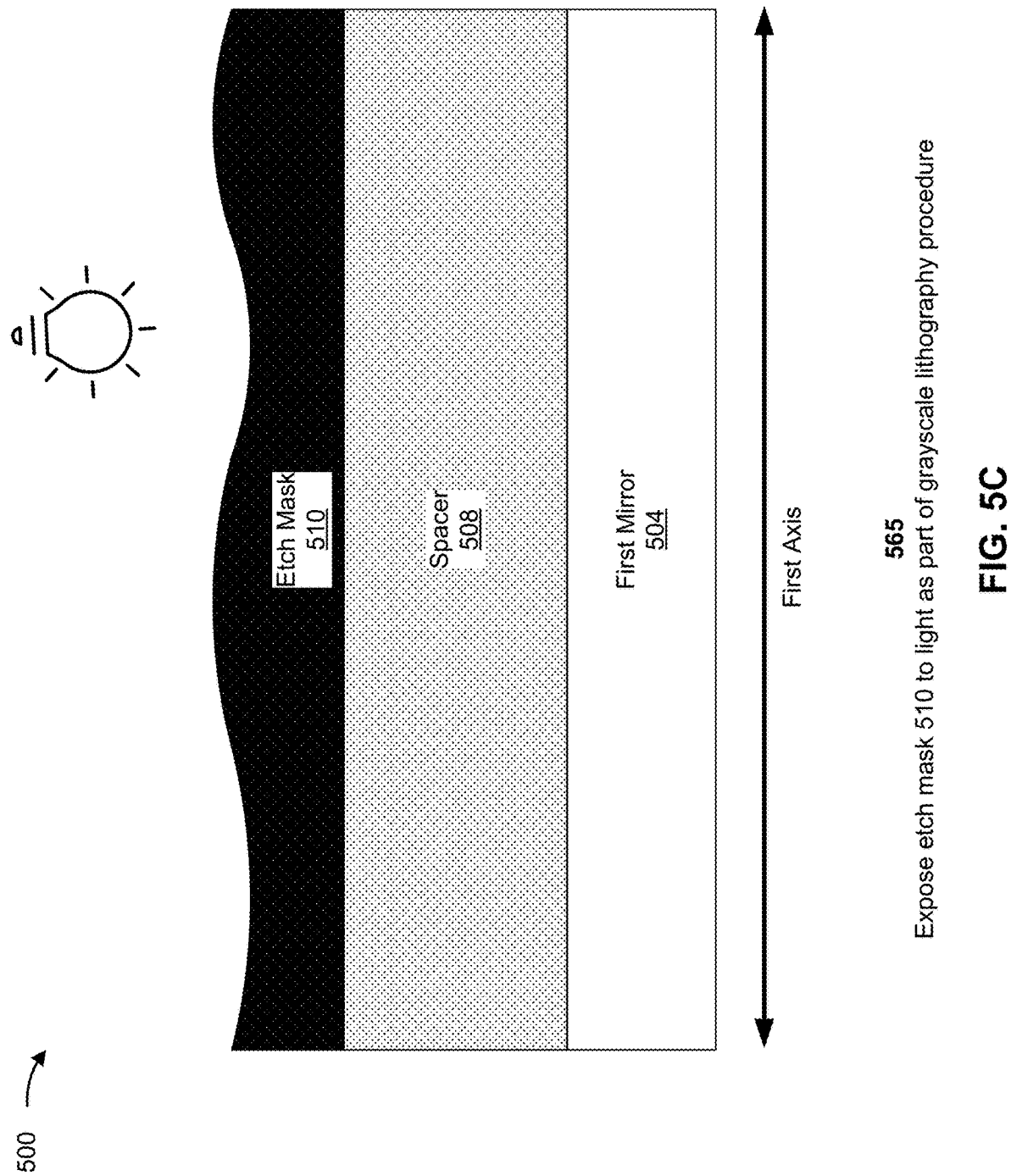

As shown in FIG. 5C, and by reference number 565, when using the grayscale lithography procedure, the formation process may further include exposing the etch mask 510 to different amounts of light (e.g., UV light) to the etch mask 510 to have a variable thickness along the first axis. For example, the variable thickness of the etch mask 510 may vary by more than, or a same amount as, an etch mask thickness threshold along the first axis. The etch mask thickness threshold may be less than or equal to 1%, 2%, and/or 3% of a maximum thickness of the variable thickness of the etch mask 510 (e.g., after exposure to the different amounts of light), of a minimum thickness of the variable thickness of the etch mask 510, and/or of an average thickness of the variable thickness of the etch mask 510 (e.g., along some or all of the first axis), among other examples.

Figure 5D:
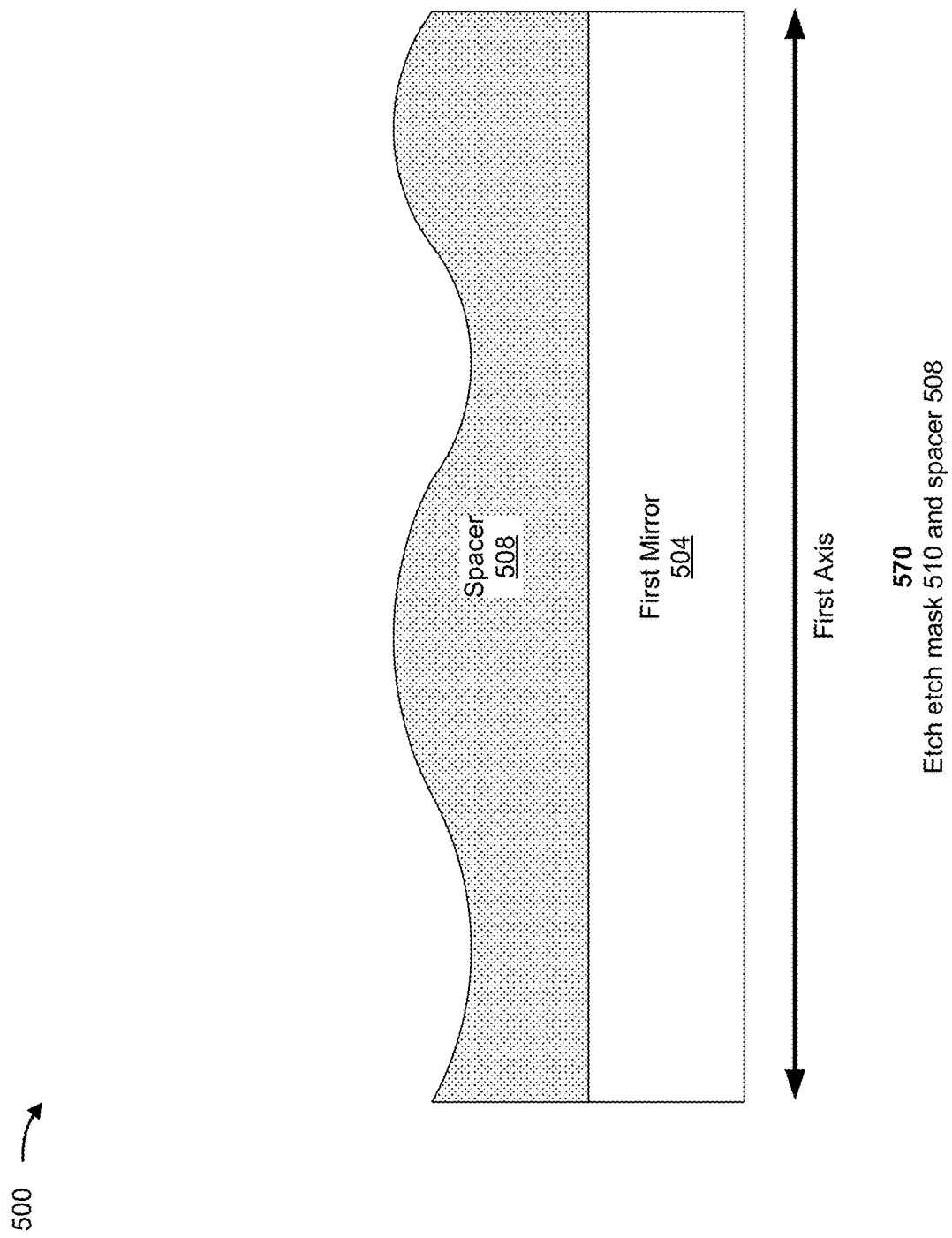

As shown in FIG. 5D, and by reference number 570, the formation process may include etching the etch mask 510 and/or the spacer 508 using an etching procedure. For example, the formation process may include using a single etching procedure, such as a single reactive ion etching procedure, to etch the etch mask 510 and/or the spacer 508. In some implementations, etching the etch mask 510 may eliminate the etch mask 510 (e.g., none, or substantially none, of the etch mask 510 remains after completion of the etching procedure).

Additionally, or alternatively, etching the spacer 508 may cause the spacer 508 to have a variable thickness along the first axis of the optical filter 502. For example, the variable thickness of the spacer 508 may vary by more than, or a same amount as, a spacer thickness threshold (e.g., as described elsewhere herein) along the first axis. In some implementations, etching the spacer 508 may cause a region that is parallel to a second axis of the optical filter 502 (e.g., that is orthogonal to the first axis of the optical filter 502) of the spacer 508 to have a uniform thickness along the second axis. For example, the uniform thickness of the region of the spacer 508 may vary by less than another spacer thickness threshold along the second axis (e.g., a variation in thickness across the region of the spacer 508 may satisfy the other spacer thickness threshold). The other spacer thickness threshold may be less than or equal to 1%, 2%, and/or 3% of a maximum thickness of the uniform thickness of the region of the spacer 508, of a minimum thickness of the uniform thickness of the region of the spacer 508, and/or of an average thickness of the uniform thickness of the region of the spacer 508 (e.g., along some or all of the second axis), among other examples. In some implementations, etching the spacer 508 may cause a thickness profile of the spacer 508, along the first axis, to have one or more portions that have a non-linear slope (e.g., a non-linear slope with an absolute value greater than zero, as described elsewhere herein).

The variable thickness of the spacer 508 along the first axis, the uniform thickness of the region of the spacer 508 along the second axis, and/or the non-linear slopes of the one or more portions of the thickness profile of the spacer 508 along the first axis (e.g., after completion of the etching procedure) may be respectively related to the variable thickness of the etch mask 510 along the first axis, a uniform thickness of the region of the etch mask 510 along the second axis, and/or non-linear slopes of one or more portions of a thickness profile of the etch mask 510 along the first axis (e.g., after exposing the etch mask 510 to light and prior to elimination of the etch mask 510 via the etching procedure). For example, a thickness of a particular portion of the spacer 508 (e.g., after completion of the etching procedure) along an axis (e.g., the first axis or the second axis) may be a particular percentage of a thickness, along the axis, of a particular portion of the etch mask 510 that is disposed on the particular portion of the spacer 508 (e.g., after exposing the etch mask 510 to light and prior to elimination of the etch mask 510 via the etching procedure). As another example, a non-linear slope of a portion of the thickness profile of the spacer 508 along the first axis (e.g., after completion of the etching procedure) is directly related to a non-linear slope of a portion of the thickness profile of the etch mask 510 along the first axis (e.g., after exposing the etch mask 510 to light and prior to elimination of the etch mask 510 via the etching procedure).

As shown in FIG. 5E, and by reference number 575, the formation process may include forming the second mirror 506 on the spacer 508. For example, the formation process may include forming the second mirror 506 on a top surface of the spacer 508. As further shown in FIG. 5E, the second mirror 506 may be formed with a uniform thickness along the first axis (e.g., the uniform thickness of the second mirror 506 may vary by less than a second mirror thickness threshold along the first axis, as described elsewhere herein).

In some implementations, the formation process may include forming an additional spacer (e.g., the additional spacer 124, as described herein in relation to FIG. 1D) on the second mirror 506 and an additional etch mask on the additional spacer (e.g., in a similar manner as that described herein in relation to FIGS. 5A-5B). The formation process may include etching the additional etch mask and/or the additional spacer using the etching procedure (e.g., in a similar manner as that described herein in relation to FIGS. 5C-5D). Accordingly, etching the additional etch mask may eliminate the additional etch mask, may cause the additional spacer to have a variable thickness along the first axis of the optical filter 502 (e.g., as shown by the variable thickness 128 of the additional spacer 124 shown in FIG. 1D), and/or may cause a thickness profile of the additional spacer, along the first axis, to include one or more portions that have a non-linear slope (e.g., a non-linear slope with an absolute value greater than zero, as shown by the non-linear slope of the thickness profile of the additional spacer 124 shown in FIG. 1D). Additionally, the formation process may include forming a third mirror (e.g., the third mirror 126, as described herein in relation to FIG. 1D) on the additional spacer (e.g., in a similar manner as that described herein in relation to FIG. 5E).

In some implementations, the formation process may include forming a plurality of optical filters 502 on a wafer (e.g., on respective regions of the wafer) at a same time (e.g., as part of the same formation process). Accordingly, each optical filter 502 may be configured to provide a matching spectral filter performance (e.g., as other optical filters 502 of the plurality of optical filters 502), as described elsewhere herein.

As indicated above, FIGS. 5A-5E are provided as an example. Other examples may differ from what is described with regard to FIGS. 5A-5E.

The foregoing disclosure provides illustration and description, but is not intended to be exhaustive or to limit the implementations to the precise forms disclosed. Modifications and variations may be made in light of the above disclosure or may be acquired from practice of the implementations.

As used herein, satisfying a threshold may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiple of the same item.

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of"). Further, spatially relative terms, such as "below," "lower," "bottom," "above," "upper," "top," and the like, may be used herein for ease of description to describe one element or feature's relationship to another element(s) or feature(s) as illustrated in the figures. The spatially relative terms are intended to encompass different orientations of the apparatus, device, and/or element in use or operation in addition to the orientation depicted in the figures. The apparatus may be otherwise oriented (rotated 90 degrees or at other orientations) and the spatially relative descriptors used herein may likewise be interpreted accordingly.

What is claimed is:

1. An optical filter, comprising:
    a first mirror that has a first uniform thickness;
    a second mirror that has a second uniform thickness; and
    a spacer that is positioned between the first mirror and the second mirror, wherein:
        the spacer has a variable thickness along a first axis of the optical filter,
        a first edge of the spacer has a minimum thickness of the variable thickness along the first axis of the optical filter,
        a second edge of the spacer has a maximum thickness of the variable thickness along the first axis of the optical filter,
        a thickness profile of the spacer, along the first axis, has a slope with an absolute value that is greater than zero,
        the variable thickness increases continuously along the slope and from the first edge to the second edge, and
        a variation in center wavelength, across a region of the optical filter that is parallel to a second axis of the optical filter, is less than a variation defined as $$D \times R \times \left(1 - \sqrt{1 - \left[\left(\frac{W}{2}/R\right)\right]^2}\right),$$

wherein the D is the slope,
    wherein the W is a filter width, and
    wherein the R is a length of a coating tool arm.

2. The optical filter of claim 1, wherein the second axis is orthogonal to the first axis, and wherein the optical filter is configured to pass light associated with a spectral range across the region of the optical filter that is parallel to the second axis.

3. The optical filter of claim 1, wherein a variation in thickness across the region of the spacer that is parallel to the second axis satisfies a spacer thickness threshold.

4. The optical filter of claim 1, wherein the optical filter is configured to pass light associated with a plurality of spectral ranges that comprises at least one of:
    one or more portions of an ultraviolet light spectral range,
    one or more portions of a visible light spectral range,
    one or more portions of a near-infrared light spectral range, one or more portions of a short-wave infrared light spectral range,
one or more portions of a mid-wave infrared light spectral range; or
one or more portions of a long-wave infrared light spectral range.

5. The optical filter of claim 1, wherein the optical filter is configured to pass light associated with a plurality of spectral ranges, and
wherein the spacer is configured to transmit greater than a threshold percentage of light associated with a spectral range that is within the plurality of spectral ranges.

6. The optical filter of claim 1, wherein the spacer is formed using an etching procedure in coordination with a grayscale lithography procedure.

7. The optical filter of claim 1, further comprising:
a third mirror that has a third uniform thickness; and
an additional spacer that is positioned between the third mirror and one of the first mirror and the second mirror, wherein the additional spacer has another variable thickness along the first axis of the optical filter.

8. The optical filter of claim 7, wherein a thickness profile of the additional spacer, along the first axis, includes one or more portions that have a non-linear slope with an absolute value that is greater than zero.

9. The optical filter of claim 1, further comprising:
one or more blocking components disposed on a surface of at least one of the first mirror, the second mirror, or the spacer.

10. A wafer, comprising:
a plurality of optical filters,
wherein an optical filter, of the plurality of optical filters, includes:
a first mirror that has a first uniform thickness;
a second mirror that has a second uniform thickness; and
a spacer that is positioned between the first mirror and the second mirror,
the spacer having a variable thickness along a first axis of the optical filter,
one or more of:
a first edge of the spacer having a minimum thickness of the variable thickness along the first axis of the optical filter, or
a second edge of the spacer having a maximum thickness of the variable thickness along the first axis of the optical filter,
the variable thickness increasing continuously along a slope of the spacer that one or more of begins at the first edge or ends at the second edge, and
a variation in center wavelength, across a region of the optical filter that is parallel to a second axis of the optical filter, being less than a variation defined as $$D \times R \times \left(1 - \sqrt{1 - \left[\left(\frac{W}{2}/R\right)\right]^2}\right),$$

wherein the D is the slope,
wherein the W is a filter width, and
wherein the R is a length of a coating tool arm.

11. The wafer of claim 10, wherein, for each optical filter, of the plurality of optical filters,
the second axis is orthogonal to the first axis, wherein the optical filter is configured to pass light associated with a spectral range across the region of the optical filter that is parallel to the second axis.

12. The wafer of claim 10, wherein the wafer has a radius X and each of the plurality of optical filters has a width Y, and
wherein a number of the plurality of optical filters is greater than or equal to $2\pi XY$.

13. The wafer of claim 10, wherein each optical filter, of the plurality of optical filters, is configured to provide a matching spectral filtering performance.

14. The wafer of claim 10, wherein each optical filter, of the plurality of optical filters, further comprises:
a third mirror that has a third uniform thickness; and
an additional spacer that is positioned between the third mirror and one of the first mirror and the second mirror, wherein at least one of:
the additional spacer has another variable thickness along the first axis of the optical filter, or
a thickness profile of the additional spacer, along the first axis, includes one or more portions that have a non-linear slope with an absolute value that is greater than zero.

15. The wafer of claim 10, wherein each optical filter, of the plurality of optical filters, further comprises:
one or more blocking components disposed on a surface of at least one of the first mirror or the second mirror.

16. An optical filter, comprising:
a first mirror;
a second mirror; and
a spacer that is positioned between the first mirror and the second mirror, wherein:
the spacer has a variable thickness along a first axis of the optical filter, and one or more of:
a first edge of the spacer having a minimum thickness of the variable thickness along the first axis of the optical filter, or
a second edge of the spacer having a maximum thickness of the variable thickness along the first axis of the optical filter,
the variable thickness increasing continuously along slope of the spacer towards one or more of the first edge or the second edge, and
a variation in center wavelength, across a region of the optical filter that is parallel to a second axis of the optical filter, is less than a variation defined as $$D \times R \times \left(1 - \sqrt{1 - \left[\left(\frac{W}{2}/R\right)\right]^2}\right),$$

wherein the D is the slope,
wherein the W is a filter width, and
wherein the R is a length of a coating tool arm.

17. The optical filter of claim 16, wherein the first edge of the spacer has the minimum thickness of the variable thickness along the first axis of the optical filter.

18. The optical filter of claim 17, wherein the second edge of the spacer has the maximum thickness of the variable thickness along the first axis of the optical filter.

19. The optical filter of claim 16, wherein the slope is a linear slope from the first edge of the spacer to the second edge of the spacer.

20. The optical filter of claim 16, wherein the spacer has a uniform thickness along the second axis of the optical filter, and wherein the spacer comprises at least one of a silicon (Si) material, a hydrogenated silicon (Si:H) material, an amorphous silicon (a-Si) material, a silicon nitride (SiN) material, a germanium (Ge) material, a hydrogenated germanium (Ge:H) material, a silicon germanium (SiGe) material, a hydrogenated silicon germanium (SiGe:H) material, a silicon carbide (SiC) material, a hydrogenated silicon carbide (SiC:H) material, a silicon dioxide ($SiO_2$) material, a tantalum pentoxide ($Ta_2O_5$) material, a niobium pentoxide ($Nb_2O_5$) material, a niobium titanium oxide ($NbTiO_x$) material, a niobium tantalum pentoxide ($Nb_2TaO_5$) material, a titanium dioxide ($TiO_2$) material, an aluminum oxide ($Al_2O_3$) material, a zirconium oxide ($ZrO_2$) material, an yttrium oxide ($Y_2O_3$) material, an aluminum nitride (AlN), or a hafnium oxide ($HfO_2$) material.

21. The optical filter of claim 16, wherein the slope is a linear slope.

\* \* \* \* \*